US006847901B2

(12) United States Patent
Suzuki et al.

(10) Patent No.: US 6,847,901 B2
(45) Date of Patent: Jan. 25, 2005

(54) ELECTROMAGNETIC FLOWMETER (75) Inventors: Shin Suzuki, Tokyo (JP); Ichiro Mitsutake, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/412,002

(22) Filed: Apr. 11, 2003

(65) Prior Publication Data

US 2004/0015302 A1 Jan. 22, 2004

(30) Foreign Application Priority Data

Apr. 18, 2002 (JP) ........................................ 2002-116294

(51) Int. Cl.$^7$ ................................................ G01F 1/00
(52) U.S. Cl. ............................. 702/38; 702/45; 702/50; 702/100; 73/861
(58) Field of Search .......................... 702/38, 45, 50, 702/100; 73/861.17, 861.16, 861.12, 700, 735, 1.16, 861

(56) References Cited

U.S. PATENT DOCUMENTS

| | | | | |
|---|---|---|---|---|
| 4,010,644 A | * | 3/1977 | Bonfig et al. ............ | 73/861.17 |
| 4,303,980 A | * | 12/1981 | Yard ............................ | 702/49 |
| 4,644,799 A | * | 2/1987 | Tomita ..................... | 73/861.12 |
| 4,709,583 A | * | 12/1987 | De Paepe et al. ........ | 73/861.17 |
| 4,856,345 A | * | 8/1989 | Mochizuki ............... | 73/861.17 |
| 5,443,552 A | * | 8/1995 | Tomita ..................... | 73/861.17 |

* cited by examiner

Primary Examiner—John Barlow
Assistant Examiner—Hien Vo
(74) Attorney, Agent, or Firm—Blakely Sokoloff Taylor & Zafman (57) ABSTRACT An electromagnetic flowmeter includes a exciting coil, exciting section, and arithmetic processing section. The exciting coil applies a magnetic field to a fluid flowing in a pipe line. The exciting section supplies an exciting current to the coil. The arithmetic processing section calculates a measurement flow rate on the basis of the measurement signal detected from the excited fluid. The arithmetic processing section includes a measurement flow rate calculation section. In calculating a measurement flow rate from the measurement signal, the measurement flow rate calculation section corrects the flow rate calculated from the measurement signal on the basis of one of adjustment coefficients, set in advance in correspondence with current values of exciting currents, which corresponds to a current value of an exciting current by which the measurement signal is obtained.

10 Claims, 11 Drawing Sheets

ELECTROMAGNETIC FLOWMETER

BACKGROUND OF THE INVENTION

The present invention relates to an electromagnetic flowmeter and, more particularly, to an electromagnetic flowmeter having a function of switching/controlling the current value of an exciting current in each range of flow rates that have been measured.

An electromagnetic flowmeter supplies an exciting current to a coil to apply a magnetic field to a fluid in a pipe line, and measures the flow rate of the fluid on the basis of the signal electromotive force detected from electrodes disposed in the pipe line. In this electromagnetic flowmeter, various kinds of noise are produced, e.g., commercial power noise mixed in the fluid, spike noise produced by the collision of foreign substances contained in the fluid with the electrodes, electrochemical noise caused by charge ions in the fluid, and noise dependent on the flow velocity and conductivity. In order to reduce the influences of such noise, the current value of an exciting current may be increased to increase the S/N ratio.

In some electromagnetic flowmeters, however, the current value of an exciting current that can be used is limited. For example, in a two-wire electromagnetic flowmeter designed to supply power and transmit a flow rate signal through a pair of signal lines, an obtained measurement flow rate is converted into a value from 0 to 100% in predetermined range, which in turn is converted into a flow rate signal formed from a loop current value from 4 to 20 mA which corresponds to the value from 0 to 100%, and the signal is output. Since the two-wire electromagnetic flowmeter uses this loop current as operating power, an exciting current of minimum 4 mA must be supplied, and the overall two-wire electromagnetic flowmeter must be operated.

Figure 9:
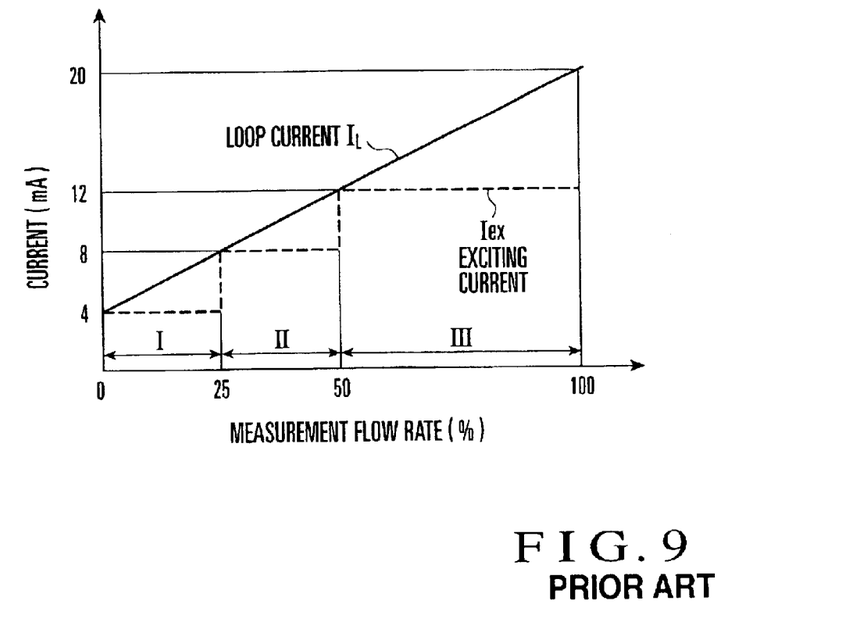
FIG. 9 is a graph showing an exciting current switching method for a conventional electromagnetic flowmeter.

Conventionally, as such a two-wire electromagnetic flowmeter, an electromagnetic flowmeter has been proposed (e.g., Japanese Patent Laid-Open No. 8-50043), in which if there is enough operating power, i.e., loop current, the current value of an exciting current is increased to increase the S/N ratio. In this two-wire electromagnetic flowmeter, as shown in FIG. 9, measured flow rates (% value) are classified into three flow rate ranges I to III, and current values of 4 mA, 8 mA, and 12 mA are used as exciting currents Iex in the respective flow rate ranges I, II, and III. This makes it possible to perform measurement by using large current values in the flow rate ranges II and III to obtain high S/N ratios as compare with the case wherein an exciting current of 4 mA is always used.

Figure 10:
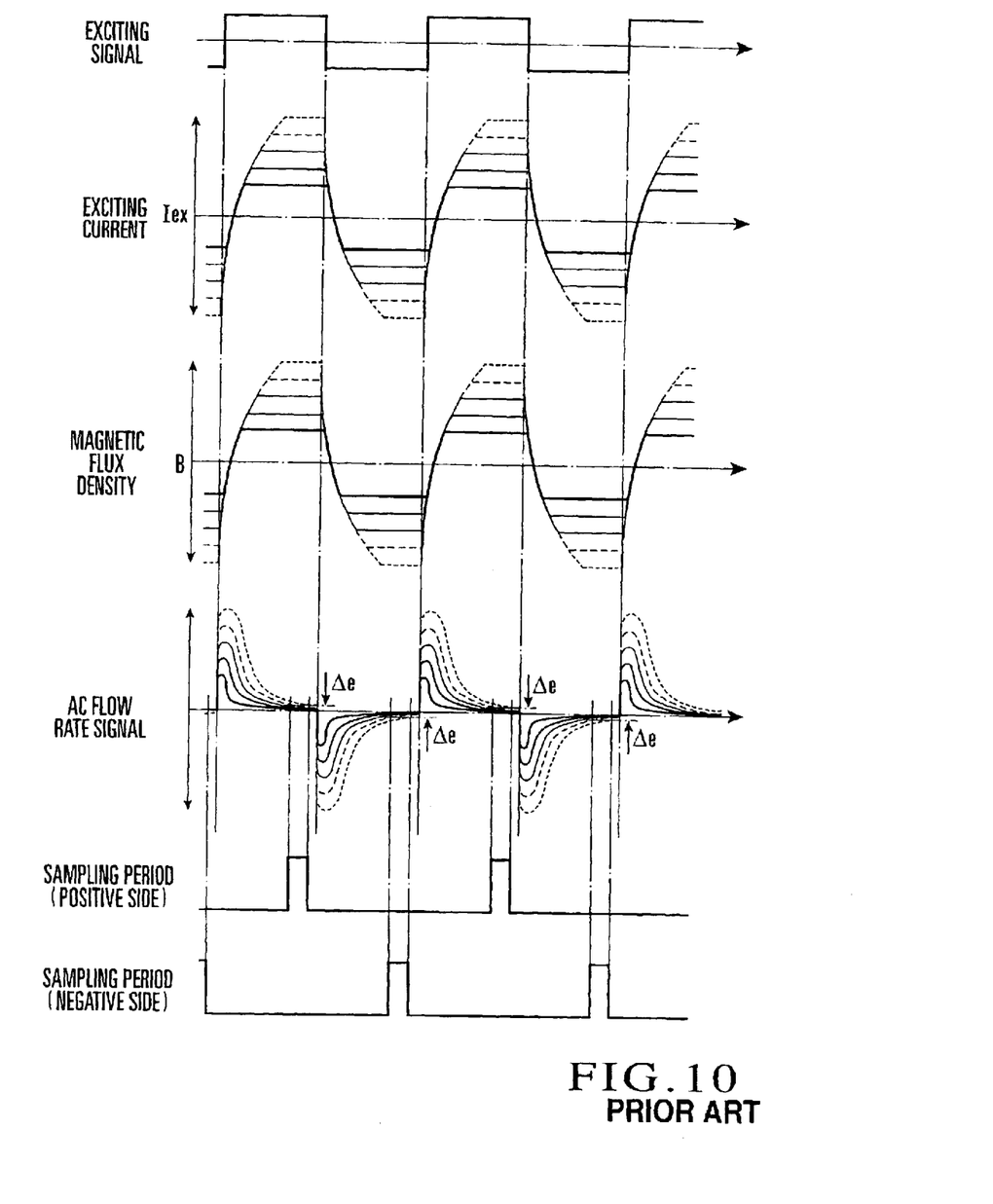
FIG. 10 is a graph for explaining errors due to magnetic flux differential noise.

In such a conventional electromagnetic flowmeter, however, since the current value of an exciting current is switched/controlled in each flow rate range, a measurement error occurs with a change in the current value of an exciting current. For example, as shown in FIG. 10, when an AC exciting current in the form of a rectangular wave is applied to the coil, the waveform of a magnetic flux density B produced by the exciting current Iex that actually flows suffers a delay in accordance with the characteristics of the coil. As a result, magnetic flux differential noise is produced in the signal electromotive force obtained from the detection elements, i.e., the AC flow rate signal.

In general, in order to suppress the influences of such magnetic flux differential noise, a sampling period during which an AC flow rate signal is sampled is set in the trailing edge portion of the pulse-like waveform which is affected little by the magnetic flux differential noise. If, however, the current value of the exciting current is increased, the magnetic flux differential noise also increases (see the broken lines in FIG. 10), and a voltage difference Δe occurs in the sampling period even at zero flow rate. This difference appears as an error in a measurement flow rate.

In addition, according to the electromagnetic flowmeter, when a measurement flow rate is calculated by using the signal electromotive force obtained by the detection electrodes, a flow rate v is obtained by e=k·B·v·D where e is a signal electromotive force, k is a constant, B is a magnetic flux, and D is the diameter of the pipe line. In this case, the magnetic flux density B is approximated by the exciting current Iex assuming that the magnetic flux density B is proportional to a magnetic field H, and the magnetic field H is proportional to the exciting current.

Figure 11:
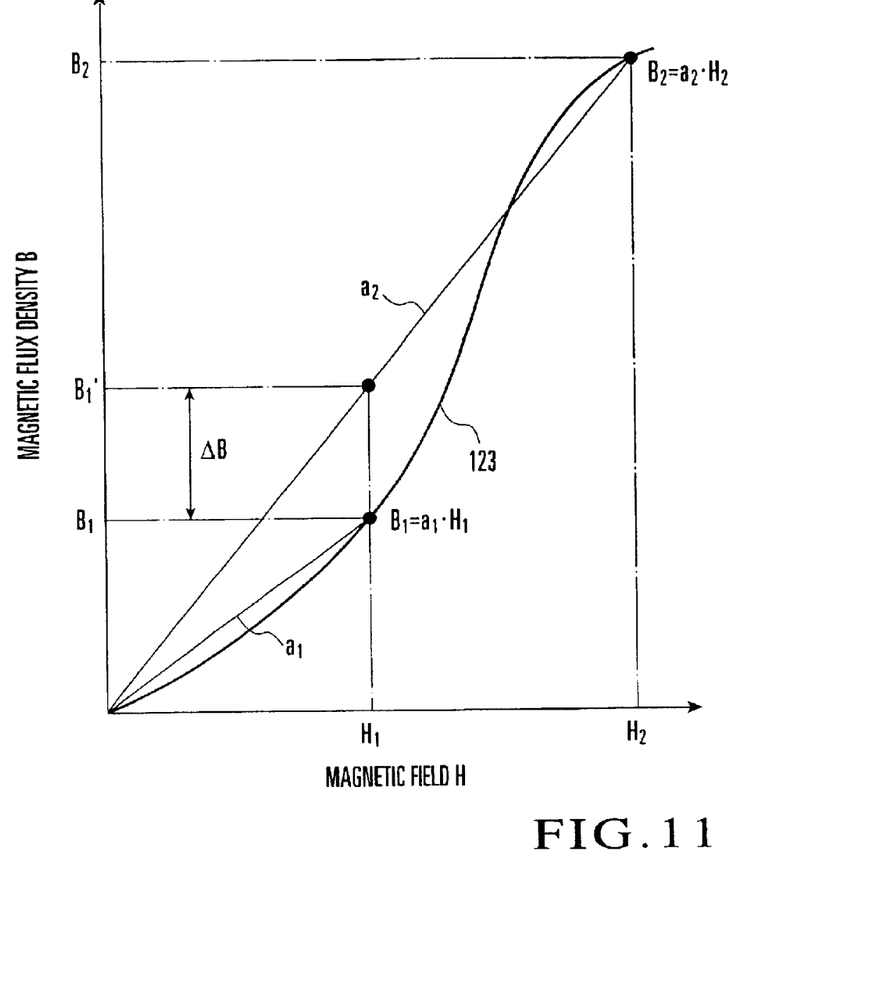
FIG. 11 is a signal waveform diagram showing an error due to the nonlinearity of a magnetic field-magnetic flux density characteristic.

In general, a coil has a nonlinear characteristic as a magnetic field-magnetic flux density characteristic. Even if, therefore, the magnetic field-magnetic flux density characteristic is linearly approximated, no large error is generated unless the magnetic field H excessively changes. For example, as shown in FIG. 11, with a magnetic field H1 and magnetic flux density B1, even if the magnetic flux density in a range equal to or less than the magnetic field H1 is approximated by B=a1·H1 (for a1=B1/H1), no large error is generated.

If, however, the magnetic field changes greatly as a large exciting current is used by extending the exciting current switching range, the magnetic field-magnetic flux density characteristic cannot be linearly approximated, resulting in a large error. For example, with a magnetic field H2 and magnetic flux density B2, if the characteristic is linearly approximated in the same manner as described above, the magnetic flux density at the magnetic field H2 or less is given by B=a2·H2 (for a2=B2/H2). Consequently, an error ΔB occurs between approximated magnetic flux density B'=a2·H1 and an actual magnetic flux density B1, resulting in an error in a measurement flow rate.

SUMMARY OF THE INVENTION

It is an object of the present invention to provide an electromagnetic flowmeter which can accurately calculate a measurement flow rate even if an exciting current is switched in a plurality of steps in a wide range.

In order to achieve the above object, according to the present invention, there is provided an electromagnetic flowmeter comprising a coil which applies a magnetic field to a fluid flowing in a pipe line, exciting means for supplying an exciting current to the coil, and arithmetic processing means for calculating a measurement flow rate on the basis of a measurement signal detected from the excited fluid, the arithmetic processing means including measurement flow rate calculation means for, in calculating a measurement flow rate from the measurement signal, correcting the flow rate calculated from the measurement signal on the basis of one of adjustment coefficients, set in advance in correspondence with current values of exciting currents, which corresponds to a current value of an exciting current by which the measurement signal is obtained.

DESCRIPTION OF THE PREFERRED EMBODIMENT

An embodiment of the present invention will be described next with reference to the accompanying drawings.

Figure 1:
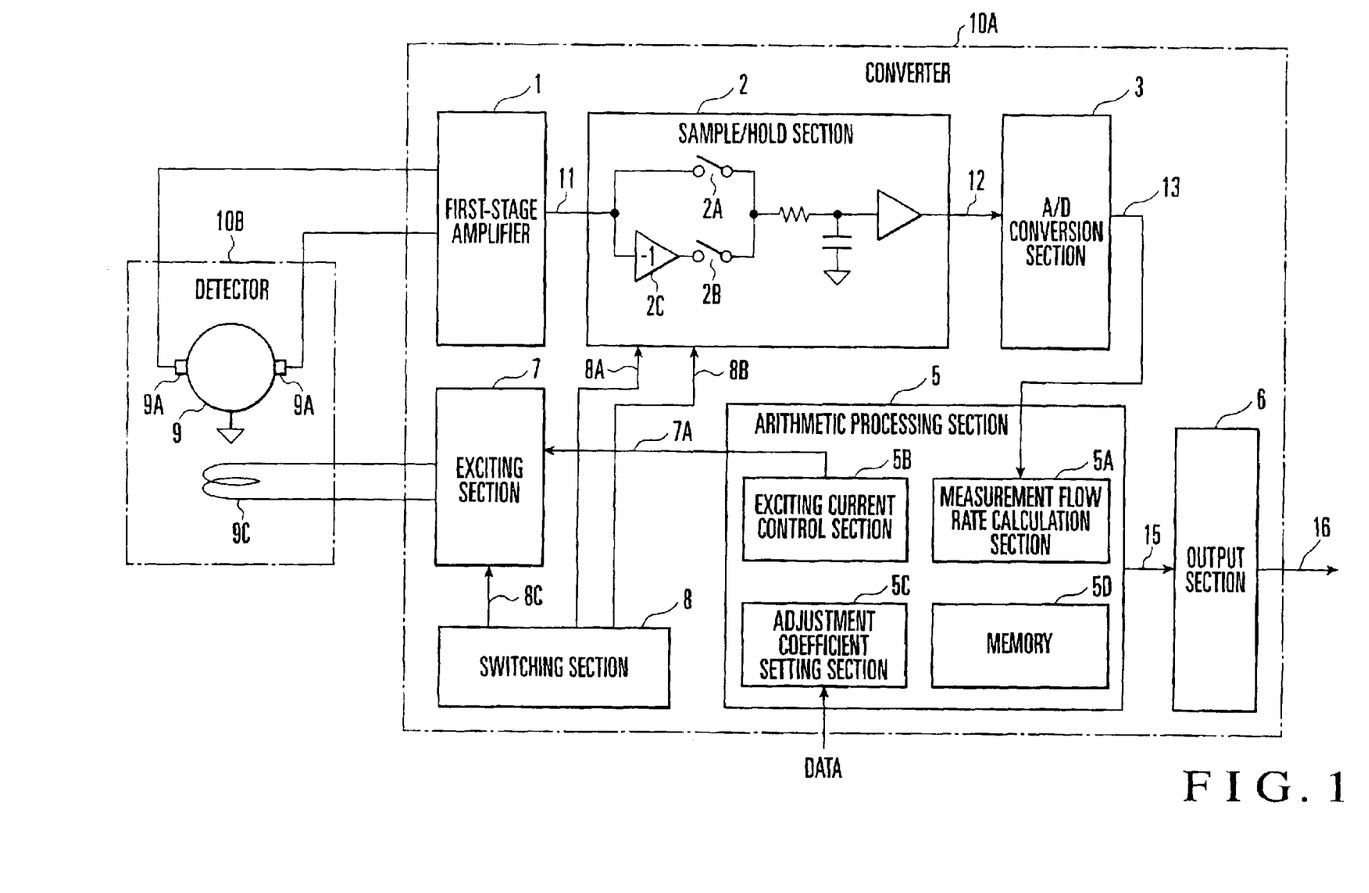
FIG. 1 is a block diagram showing the arrangement of an electromagnetic flowmeter according to an embodiment of the present invention.

FIG. 1 shows the arrangement of an electromagnetic flowmeter according to an embodiment of the present invention. In this electromagnetic flowmeter, a detector 10B applies a magnetic field to a fluid in a pipe line on the basis of a predetermined exciting current, and detects/outputs the signal electromotive force produced in the fluid as a detection signal. A converter 10A outputs a predetermined AC exciting current to the detector 10B and calculates/outputs a flow rate in a pipe line 9 by performing signal processing of the detection signal from the detector 10B.

In the detector 10B, detection electrodes 9A and 9B are electrodes which are disposed to face the inner wall of the pipe line 9 through which a target fluid flows, and detect the signal electromotive force produced in the fluid. An exciting coil 9C is excited on the basis of an exciting current from the converter 10A and applies a magnetic field to the fluid in the pipe line 9.

In the converter 10A, a switching section 8 generates and outputs sampling signals 8A and 8B and exciting signal 8C on the basis of a predetermined clock. On the basis of the exciting signal 8C from the switching section 8, an exciting section 7 outputs an exciting current having an AC rectangular wave and predetermined frequency with the current value designated by an exciting current control signal 7A.

A first-stage amplifier 1 attenuates the pulse-like noise and low-frequency noise mixed in the detection signal obtained from the detection electrodes 9A and 9B of the detector 10B by using a high-pass filter, AC-amplifies the detection signal by using an AC amplification circuit, and outputs the resultant signal as an AC flow rate signal 11 whose amplitude changes with a flow rate.

A sample/hold section 2 samples the AC flow rate signal 11 from the first-stage amplifier 1 on the basis of the sampling signals 8A and 8B from the switching section 8, and outputs the resultant signal as a DC flow rate signal 12 whose DC potential changes with a flow rate.

Note that a sampling period is set in the trailing edge portion (hatched portion) of the waveform of the AC flow rate signal 11 from the first-stage amplifier 1, which is affected little by the magnetic flux differential noise produced by the exciting coil 9C. The sample/hold section 2 integrates the AC flow rate signal 11 by short-circuiting switches 2A and 2B only during this sampling period, and outputs the resultant signal as the DC flow rate signal 12.

When the AC flow rate signal 11 is on the positive side, only the switch 2A is short-circuited on the basis of the switching signal 8A. When the AC flow rate signal 11 is on the negative side, the AC flow rate signal 11 is inverted by an inverter 2C, and then only the switch 2B is short-circuited on the basis of the switching signal 8B.

An A/D conversion section 3 A/D-converts the DC flow rate signal 12 from the sample/hold section 2 into a digital flow rate signal 13, and outputs it.

An arithmetic processing section 5 calculates a flow rate by executing arithmetic processing for the digital flow rate signal 13 from the A/D conversion section 3. The arithmetic processing section 5 corrects the calculated flow rate on the basis of an adjustment coefficient corresponding to the exciting current value at that time, and outputs the resultant value as a measurement flow rate 15. The arithmetic processing section 5 also performs switching control on the current value of an exciting current on the basis of the calculated measurement flow rate. An output section 6 converts the measurement flow rate 15 output from the arithmetic processing section 5 into a predetermined flow rate signal (loop current) 16 and outputs it.

The arithmetic processing section 5 includes a measurement flow rate calculation section 5A, exciting current control section 5B, adjustment coefficient setting section 5C, and memory 5D. The measurement flow rate calculation section 5A calculates a flow rate on the basis of the digital flow rate signal 13 output from the A/D conversion section 3, and corrects the flow rate by using one of the adjustment coefficients, set in the memory 5D, which corresponds to the exciting current value at that time.

The exciting current control section 5B selects an exciting current value corresponding to the current flow rate by using the exciting current control signal 7A, and designates it with respect to the exciting section 7. The adjustment coefficient setting section 5C calculates an adjustment coefficient for correcting a flow rate for each of the exciting currents switched by the exciting current control section 5B, and sets it in the memory 5D in advance. The memory 5D stores various kinds of information used for processing in the arithmetic processing section 5, e.g., adjustment coefficients used by the measurement flow rate calculation section 5A to correct flow rates.

In the arithmetic processing section 5, the respective functional sections, i.e., the measurement flow rate calculation section 5A, exciting current control section 5B, and adjustment coefficient setting section 5C, are implemented by the cooperation between hardware resources including a microprocessor such as a CPU and its peripheral circuits and software executed by the microprocessor.

Figure 2:
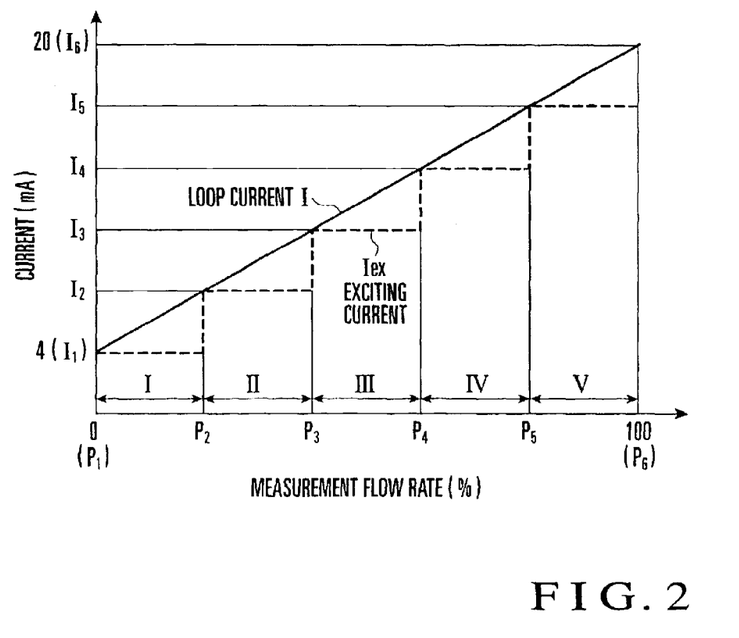
FIG. 2 is a graph for explaining an exciting current switching method for the electromagnetic flowmeter in FIG. 1.

The operation of the electromagnetic flowmeter according to this embodiment will be described next with reference to FIG. 2. FIG. 2 explains an exciting current switching method for the electromagnetic flowmeter according to this embodiment. Table 1 shows the adjustment coefficients used for flow rate calculation.

TABLE 1

| Flow Rate Range (Measurement Value %) | Exciting Current Iex | Zero Adjustment Coefficient Vz | Excitation Adjustment Coefficient A |
|---|---|---|---|
| I($P_1$–$P_2$) | $I_1$ | Vz(1) | A(1) |
| II($P_2$–$P_3$) | $I_2$ | Vz(2) | A(2) |
| III($P_3$–$P_4$) | $I_3$ | Vz(3) | A(3) |
| IV($P_4$–$P_5$) | $I_4$ | Vz(4) | A(4) |
| V($P_5$–$P_6$) | $I_5$ | Vz(5) | A(5) |

In this embodiment, an exciting current is switched in a plurality of steps, five steps in this case, on the basis of the measurement flow rate calculated by the measurement flow rate calculation section 5A of the arithmetic processing section 5. Referring to FIG. 2, the abscissa indicates the measurement flow rate in % value basis with respect to a loop current range of 4 to 40 mA; and the ordinate, the exciting current and loop current at each flow rate.

More specifically, the measurement flow rates (% value) are classified into five flow rate ranges I to V, and current values $I_1$ (4 mA), $I_2$, $I_3$, $I_4$, and $I_5$ are used as exciting currents in the respective flow rate ranges I, II, III, IV, and V. This makes it possible to perform measurement in the flow rate ranges II to V by using large current values as compared with the case wherein an exciting current given by $I_1$=4 mA is always used, thereby obtaining a high S/N ratio.

In this case, as described above, when an exciting current in the form of an AC rectangular wave is applied to the exciting coil 9C, the waveform of the exciting current and the magnetic flux which actually flow suffer delays in accordance with the characteristics of the exciting coil 9C. As a result, magnetic flux differential noise is produced in the signal electromotive force, i.e., the AC flow rate signal, obtained from the detection electrodes 9A and 9B.

In this embodiment, as indicated by Table 1, the measurement flow rates at zero flow rate are registered in advance as zero adjustment coefficients Vz(1) to Vz(5) in the memory 5D in correspondence with the exciting currents I1 to I5. When a measurement flow rate is calculated by the measurement flow rate calculation section 5A, a zero adjustment coefficient Vz(i) corresponding to an exciting current Ii at that time is used to correct the measurement flow rate.

As described above with reference to FIG. 10, the error caused by magnetic flux differential noise is added to a signal electromotive force so as to be superimposed thereon. Therefore, a flow rate corresponding to the error caused by the magnetic flux differential noise produced by each exciting current may be subtracted from a measurement flow rate v calculated from the signal electromotive force. If the zero adjustment coefficient at the exciting current Ii is given by $$Vz(i)=e/k/B/D$$

then a measurement flow rate after correction is calculated by $$V=v-Vz(i)$$

When an exciting current is switched in a plurality of steps, an error is also caused by the nonlinearity of a magnetic field-magnetic flux density characteristic as described with reference to FIG. 11.

In this embodiment, as indicated by Table 1, magnetic flux density ratios or flow rate ratios which indicate magnetic flux density errors caused by the nonlinearity of the magnetic field-magnetic flux density characteristic are registered in advance as excitation adjustment coefficients A(1) to A(5) in the memory 5D in correspondence with the exciting currents I1, I2, I3, I4, and I5. When a measurement flow rate is calculated by the measurement flow rate calculation section 5A, an excitation adjustment coefficient A(i) corresponding to the exciting current Ii at that time is used to correct the measurement flow rate.

The nonlinearity of the magnetic field-magnetic flux density characteristic appears as an error between a standard magnetic flux density Bi' used for each exciting current Ii at the time of calculation of a measurement flow rate and a magnetic flux density Bi that is actually produced in the pipe line. In this case, since the measurement flow rate v is inversely proportional to the magnetic flux density, the ratio of the actual magnetic flux density Bi to the standard magnetic flux density Bi' at each exciting current, i.e., $$A(i)=Bi/Bi'$$

my be added up to the measurement flow rate calculated by using the standard magnetic flux density Bi'. Letting A(i) be an excitation adjustment coefficient at the exciting current Ii, the measurement flow rate V after correction is calculated by $$V=v·A(i)$$

Note that the ratio of a known flow rate and the corresponding measurement flow rate may be used as the excitation adjustment coefficient A(i) instead of a magnetic flux density ratio.

When both the error caused by magnetic flux differential noise and the error due to the nonlinearity of the magnetic field-magnetic flux density characteristic are to be corrected, both the zero adjustment coefficient Vz(i) and the excitation adjustment coefficient A(i) are used to calculate the measurement flow rate V after correction according to $$V=v·A(i)-Vz(i)$$

In this manner, adjustment coefficients for correcting the error caused by magnetic flux differential noise and the error due to the nonlinearity of the magnetic field-magnetic flux density characteristic are registered in advance in the memory 5D in correspondence with each exciting current. When a measurement flow rate is calculated by the measurement flow rate calculation section 5A, an adjustment coefficient corresponding to the exciting current at that time is used to correct the measurement flow rate. Even if, therefore, the exciting current is switched in a wide range, a measurement flow rate can be calculated with high precision.

Figure 3:
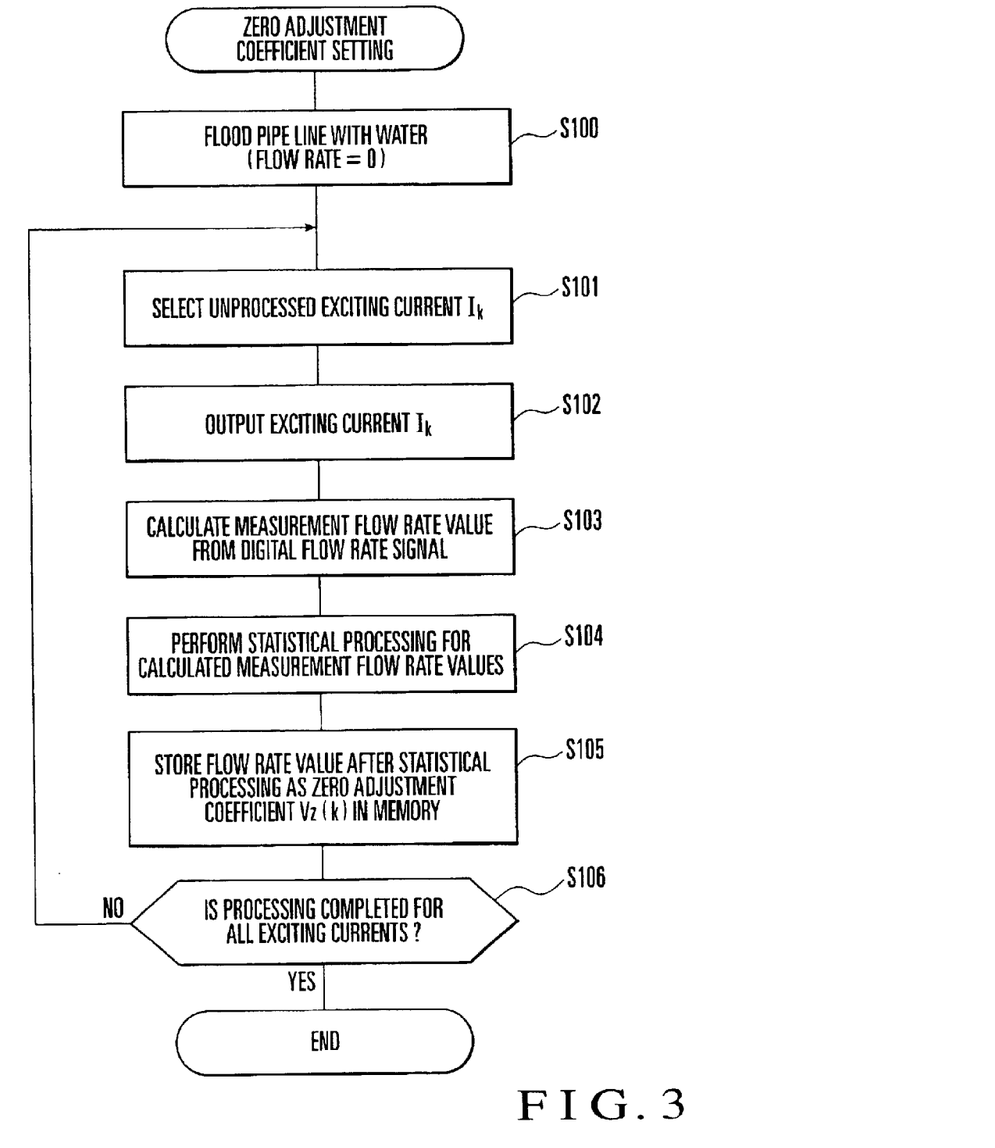
FIG. 3 is a flow chart showing zero adjustment coefficient setting processing.
Figure 4:
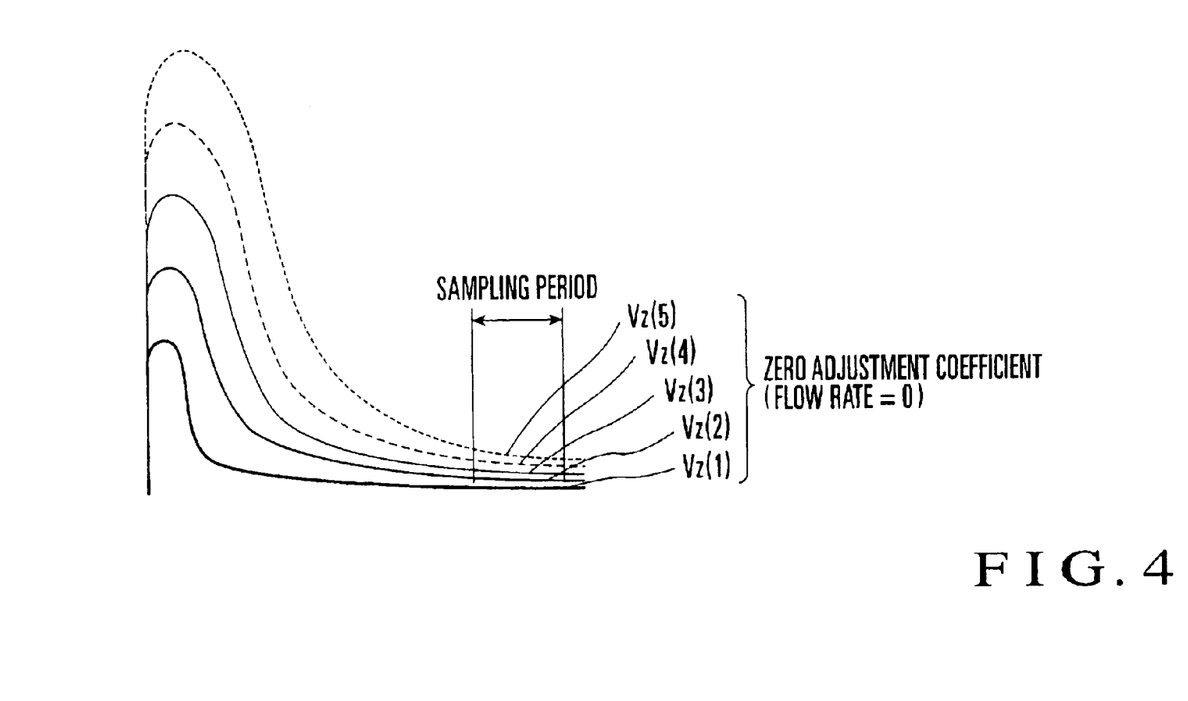
FIG. 4 is a graph for explaining zero adjustment coefficients.

A zero adjustment coefficient setting method will be described next with reference to FIGS. 3 and 4. FIG. 3 shows zero adjustment coefficient setting processing. FIG. 4 explains zero adjustment coefficients.

The adjustment coefficient setting section 5C of the arithmetic processing section 5 calculates in advance zero adjustment coefficients at the respective exciting currents on the basis of the zero adjustment coefficient setting processing in FIG. 3, and sets/registers them in the memory 5D.

First of all, the pipe line 9 of this electromagnetic flowmeter is flooded with water in advance (step S100). At this time, the flow rate is set to zero. The exciting current control section 5B then selects an unprocessed exciting current Ik from the respective exciting currents (step S101). The exciting section 7 supplies the exciting current Ik to the exciting coil 9C (step S102).

In accordance with this operation, the signal electromotive force produced in the electrodes 9A and 9B is amplified by the first-stage amplifier 1, and the resultant AC flow rate signal 11 is sampled by the sample/hold section 2 as in normal flow rate measurement. The resultant DC flow rate signal 12 is loaded into the measurement flow rate calculation section 5A through the A/D conversion section 3 to calculate a measurement flow rate at the time of zero flow rate (step S103).

In this manner, a measurement flow rate at the time of zero flow rate is calculated more than once by using a selected exciting current, and statistical processing like averaging is performed (step S104). With this operation, as shown in FIG. 4, an error flow rate due to magnetic flux differential noise is calculated, and the resultant error flow rate is stored as a zero adjustment coefficient Vz(k) at the exciting current Ik in the memory 5D (step S105).

If zero adjustment coefficient setting processing is not completed for all the exciting currents (step S106: NO), the flow returns to step S101 to execute processing associated with an unprocessed exciting current. When zero adjustment coefficient setting processing is completed for all the exciting currents (step S106: YES), the series of zero adjustment coefficient setting operations is terminated. As a consequence, as shown in FIG. 4, errors caused by magnetic flux differential noise which differ depending on the magnitudes of exciting currents are separately set for the respective exciting currents.

In this manner, the measurement flow rates measured by the same processing operation as that in normal flow rate measurement while the pipe line 9 is flooded with water and the flow rate is set to zero are set as zero adjustment coefficients. This makes it possible to easily set zero adjustment coefficients without requiring any special apparatus or sophisticated processing. In addition, since zero adjustment coefficients can be set by the adjustment coefficient setting section 5C of the converter 10A using the actual electromagnetic flowmeter, i.e., the converter 10A and detector 10B, errors due to variations among apparatuses are small, and zero adjustment coefficients can be set with high precision.

If variations among apparatuses are small with respect to magnetic flux differential noise, the zero adjustment coefficients obtained by a plurality of electromagnetic flowmeters may be statistically processed, and the resultant representative zero adjustment coefficients may be set in the memories 5D of the respective electromagnetic flowmeters. This eliminates the necessity to provide the adjustment coefficient setting section 5C for the converter 10A.

Figure 5:
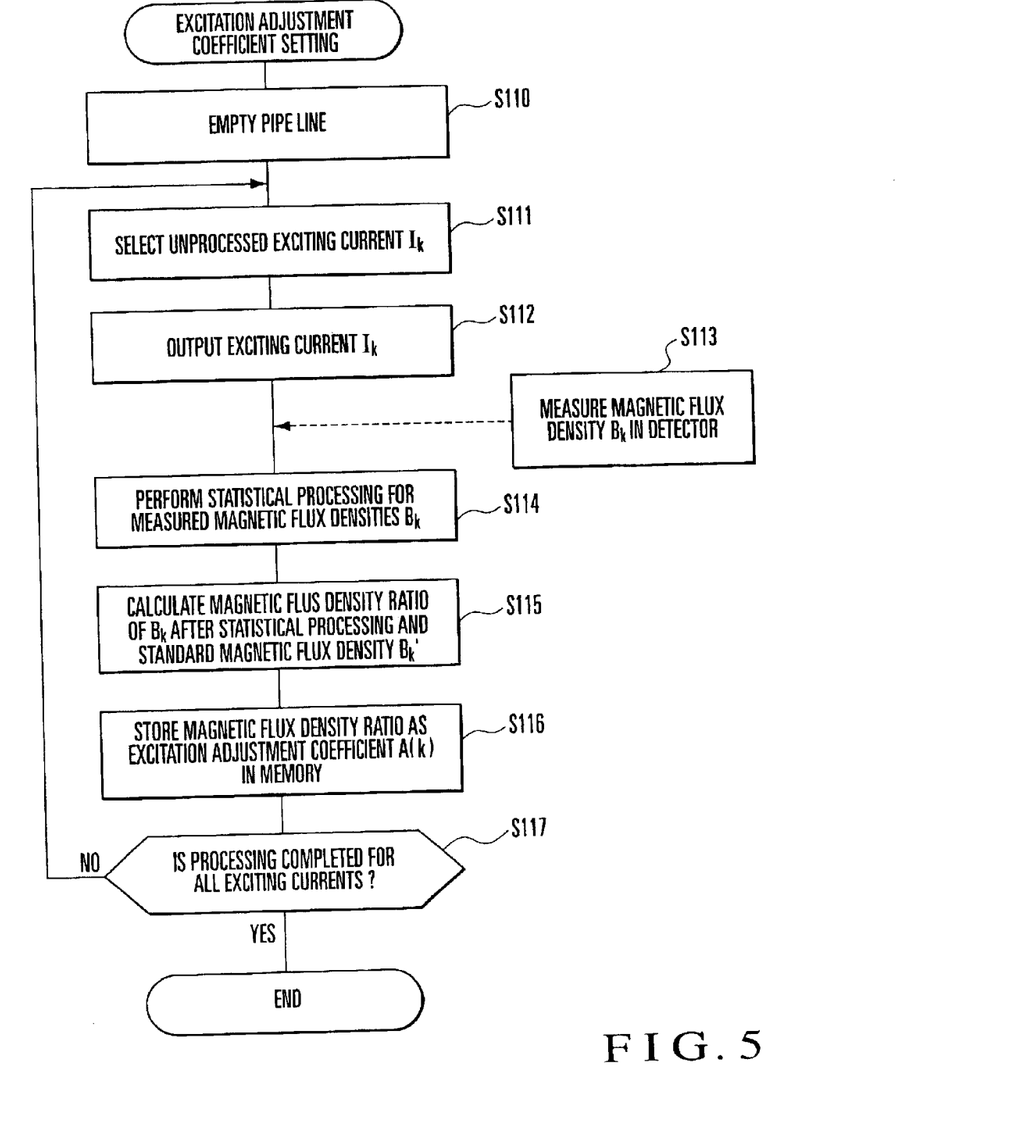
FIG. 5 is a flow chart showing excitation adjustment coefficient setting processing.
Figure 6:
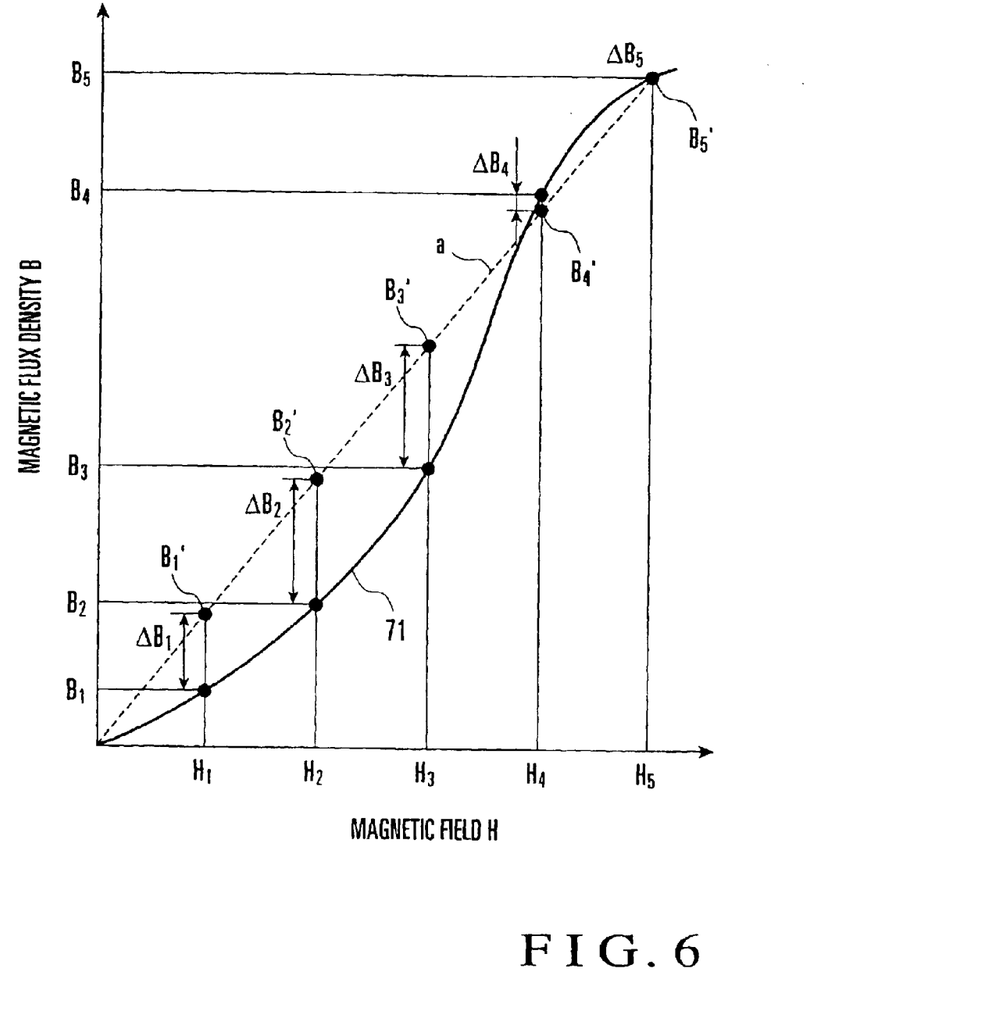
FIG. 6 is a graph for explaining excitation adjustment coefficients.

An excitation adjustment coefficient setting method will be described next with reference to FIGS. 5 and 6. FIG. 5 shows excitation adjustment coefficient setting processing. FIG. 6 explains excitation adjustment coefficients. The adjustment coefficient setting section 5C of the arithmetic processing section 5 calculates in advance excitation adjustment coefficients at the respective exciting currents on the basis of the excitation adjustment coefficient setting processing in FIG. 5, and registers them in the memory 5D.

First of all the pipe line 9 of the electromagnetic flowmeter is emptied (step S110). The exciting current control section 5B then selects the unprocessed exciting current Ik from the respective exciting currents (step S111). The exciting section 7 supplies the exciting current Ik to the exciting coil 9C (step S112).

At this time, the magnetic flux produced in the pipe line 9 of the electromagnetic flowmeter is measured by using a separate magnetic field measuring unit, and the measurement result is input as data to the adjustment coefficient setting section 5C (step S113). The adjustment coefficient setting section 5C performs statistical processing such as averaging of a plurality of measurement results input externally in this manner, i.e., a plurality of magnetic fluxes at the exciting current Ik (step S114). With this operation, an actual magnetic flux density Bk containing the nonlinearity of the magnetic field-magnetic flux characteristic at the exciting current Ik can be obtained.

As shown in FIG. 6, the relationship between the actual magnetic flux density Bk and a standard magnetic flux density Bk' used for flow rate calculation is represented by using a differential magnetic flux density ΔBk as follows:

$$Bk = Bk' - \Delta Bk$$

In this embodiment, this value is expressed by using an excitation adjustment coefficient A(k) as follows:

$$Bk = A(k) \cdot Bk'$$

and correction is made by only performing a multiplication for the measurement flow rate calculated by using the standard magnetic flux density Bk'. For example, If standard magnetic flux density B'=a·H (where a=$H_5$/$B_5$), then $$B_1 = B'_1 - \Delta B_1 = A(1) \cdot B'_1$$

$$A(1) = B_1 / B'_1$$

$$B_2 = B'_2 - \Delta B_2 = A(2) \cdot B'_2$$

$$A(2) = B_2 / B'_2$$

$$\vdots$$

$$B_5 = B'_5 - \Delta B_5 = A(5) \cdot B'_5$$

$$A(5) = B_5 / B'_5$$

Therefore, the ratio of the actual magnetic flux density Bk to the standard magnetic flux density Bk' used for flow rate calculation at this exciting current, i.e., Bk/Bk', is obtained (step S115), and the obtained ratio is stored as the excitation adjustment coefficient A(k) at the exciting current Ik in the memory 5D (step S116).

If excitation adjustment coefficient setting processing is not completed for all the exciting currents (step S117: NO), the flow returns to step S111 to execute processing associated with an unprocessed exciting current. When excitation adjustment coefficient setting processing is completed for all the exciting currents (step S117: YES), the series of excitation adjustment coefficient setting operations is terminated. With this processing, as shown in FIG. 6, with regard to magnetic field-magnetic flux characteristics 71 which differ depending on exciting currents, the excitation adjustment coefficient A(k) that approximates a magnetic flux with the minimum error can be obtained at each exciting current.

In this manner, the magnetic flux density Bk actually produced in the pipe line 9 at each exciting current is measured while the pipe line 9 is empty, and the ratio of the actual magnetic flux density to the standard magnetic flux density used for flow rate calculation at the exciting current is set as an excitation adjustment coefficient. This makes it possible to easily set excitation adjustment coefficients without requiring any sophisticated processing. In addition, since excitation adjustment coefficients can be set by the adjustment coefficient setting section 5C of the converter 10A using the actual electromagnetic flowmeter, i.e., the converter 10A and detector 10B, errors due to variations among apparatuses are small, and excitation adjustment coefficients can be set with high precision.

If variations among apparatuses are small with respect to magnetic field-magnetic flux characteristics, the excitation adjustment coefficients obtained by a plurality of electromagnetic flowmeters may be statistically processed, and the resultant representative excitation adjustment coefficients may be set in the memories 5D of the respective electromagnetic flowmeters. This eliminates the necessity to provide the adjustment coefficient setting section 5C for the converter 10A.

Figure 7:
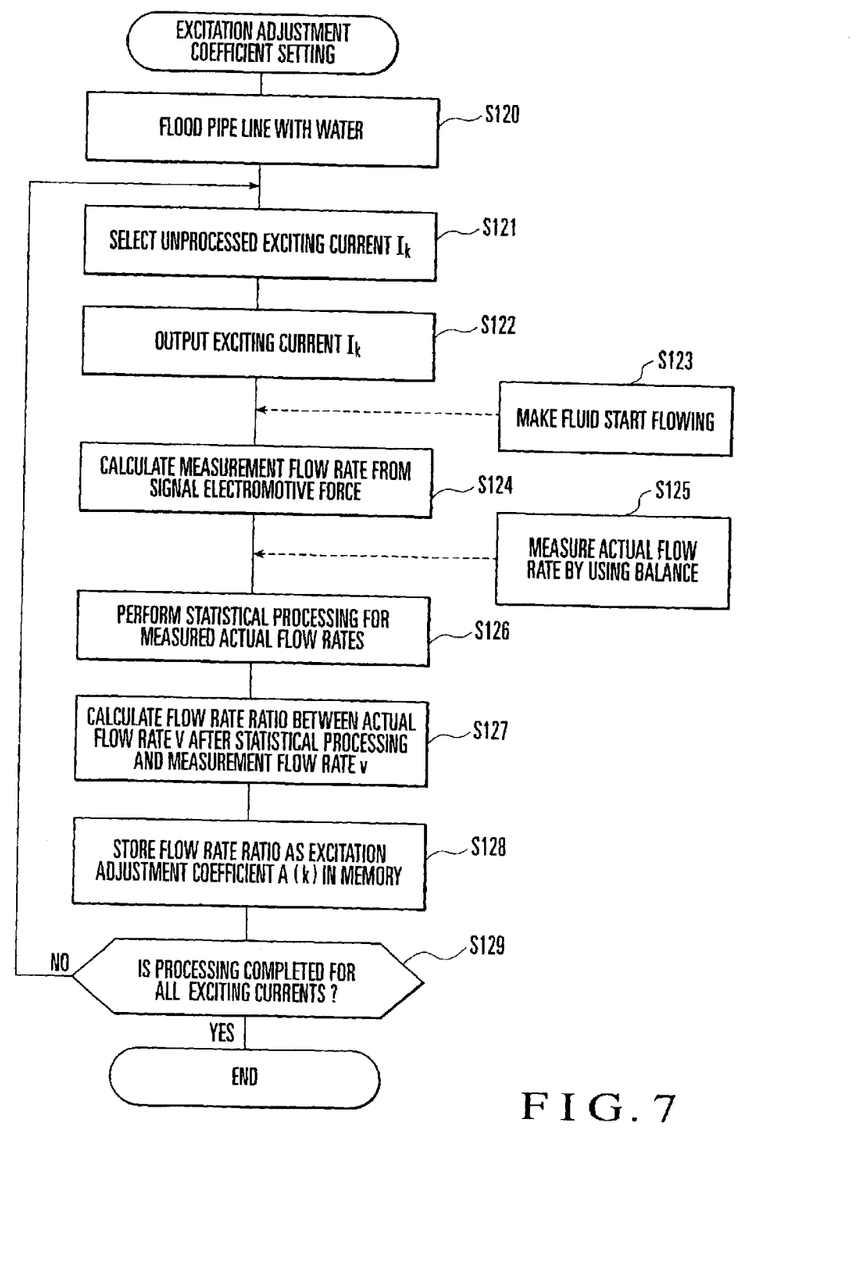
FIG. 7 is a flow chart showing another kind of excitation adjustment coefficient setting processing.

Another excitation adjustment coefficient setting method will be described next with reference to FIG. 7. FIG. 7 shows another kind of excitation adjustment coefficient setting processing. The adjustment coefficient setting section 5C of the arithmetic processing section 5 calculates in advance excitation adjustment coefficients at the respective exciting currents on the basis of the excitation adjustment coefficient setting processing in FIG. 7, and registers them in the memory 5D.

First of all, the pipe line 9 of the electromagnetic flowmeter is flooded with water (step S120). The exciting current control section 5B then selects the unprocessed exciting current Ik from the respective exciting currents (step S121). The exciting section 7 supplies the exciting current Ik to the exciting coil 9C (step S122).

A fluid is then made to actually flow in the pipe line 9 (step S123), and the measurement flow rate calculation section 5A calculates a measurement flow rate by normal measurement operation (step S124). Along with this operation, the actual flow rate of fluid flowing in the pipe line 9 is measured by a separate balance, and the measurement result is input as data to the adjustment coefficient setting section 5C (step S125). The adjustment coefficient setting section 5C performs statistical processing such as averaging of a plurality of measurement results input externally in this manner, i.e., a plurality of actual flow rates at the exciting current Ik (step S126). With this processing, the actual flow rate V containing no error due to the nonlinearity of the magnetic field-magnetic flux characteristic is obtained, and the ratio of the actual flow rate V to the measurement flow rate v is calculated by the measurement flow rate calculation section 5A, i.e., V/v (step S127). This value is stored as the excitation adjustment coefficient A(k) at the exciting current Ik in the memory 5D (step S128).

If excitation adjustment coefficient setting processing is not completed for all the exciting currents (step S129: NO), the flow returns to step S121 to execute processing associated with an unprocessed exciting current. When excitation adjustment coefficient setting processing is completed for all the exciting currents (step S129: YES), the series of excitation adjustment coefficient setting operations is terminated. With this processing, with regard to errors due to the nonlinearity of the magnetic field-magnetic flux characteristics which differ depending on exciting currents, the excitation adjustment coefficient A(k) that makes a correction for each exciting current can be obtained.

In this manner, the ratio of the actual flow rate obtained by conducting an actual flow test on the pipe line 9 to the measurement flow rate obtained by measurement performed by the electromagnetic flowmeter is set as an excitation adjustment coefficient. This makes it possible to set excitation adjustment coefficients which can accurately correct the errors due to the nonlinearity of the magnetic field-magnetic flux characteristic without requiring any sophisticated processing. In addition, since excitation adjustment coefficients can be set by the adjustment coefficient setting section 5C using the actual electromagnetic flowmeter, i.e., the converter 10A and detector 10B, errors due to variations among apparatuses are small, and excitation adjustment coefficients can be set with high precision.

If variations among apparatuses are small with respect to magnetic field-magnetic flux characteristics, the excitation adjustment coefficients obtained by a plurality of electromagnetic flowmeters may be statistically processed, and the resultant representative excitation adjustment coefficients may be set in the memories 5D of the respective electromagnetic flowmeters. This eliminates the necessity to provide the adjustment coefficient setting section 5C for the converter 10A.

Figure 8:
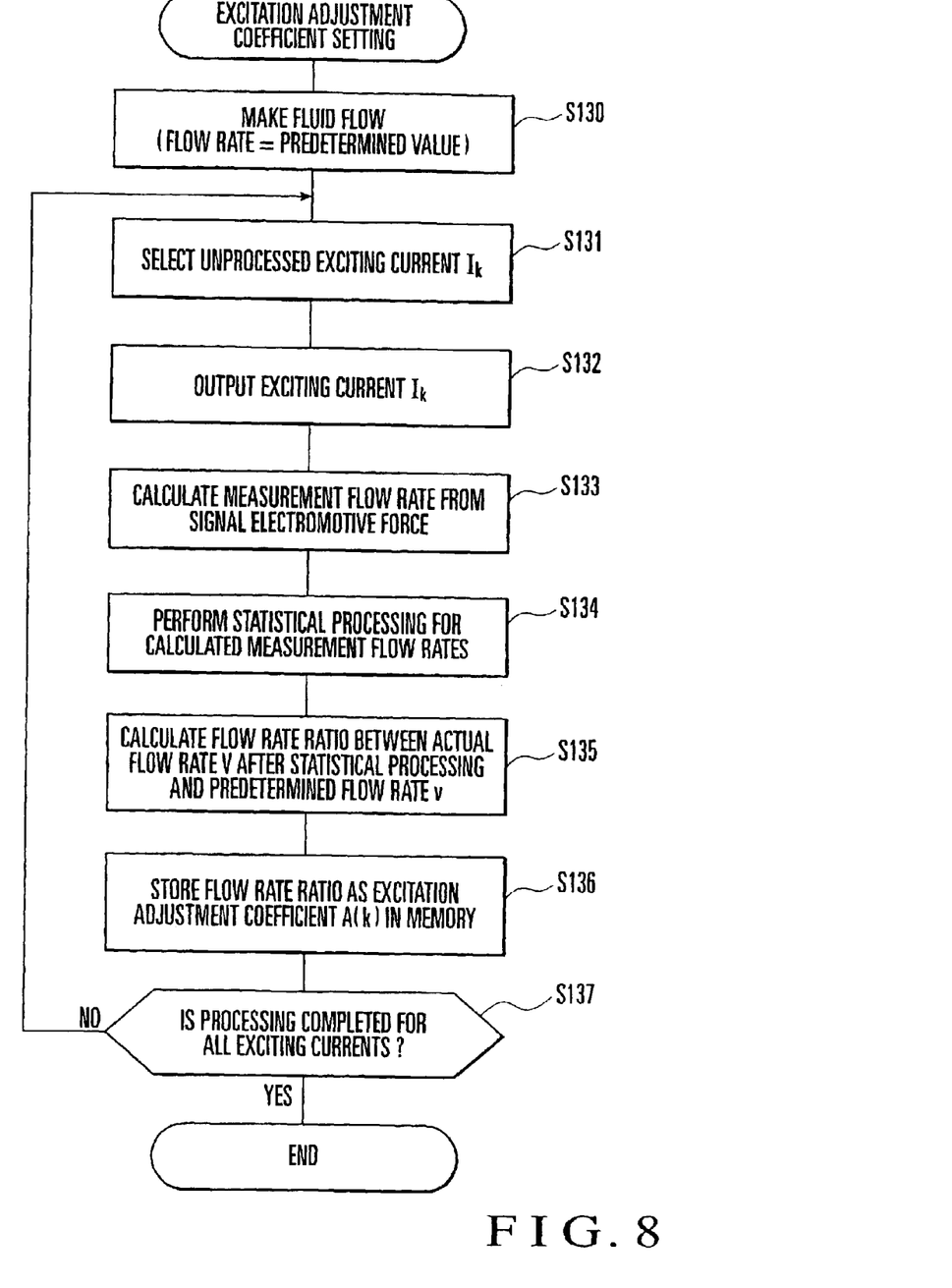
FIG. 8 is a flow chart showing still another kind of excitation adjustment coefficient setting processing.

Still another excitation adjustment coefficient setting method will be described next with reference to FIG. 8. FIG. 8 shows still another kind of excitation adjustment coefficient setting processing. The adjustment coefficient setting section 5C of the arithmetic processing section 5 calculates in advance excitation adjustment coefficients at the respective exciting currents on the basis of the excitation adjustment coefficient setting processing in FIG. 8, and registers them in the memory 5D.

First of all, a fluid is made to flow in the pipe line 9 of the electromagnetic flowmeter at a predetermined (known) flow rate (step S130). The exciting current control section 5B then selects the unprocessed exciting current Ik from the respective exciting currents (step S131). The exciting section 7 supplies the exciting current Ik to the exciting coil 9C (step S132).

At this time, the measurement flow rate calculation section 5A calculates a measurement flow rate by performing normal measurement operation (step S133). The adjustment coefficient setting section 5C performs statistical processing such as averaging of a plurality of measurement flow rates measured by the measurement flow rate calculation section 5A in this manner (step S134). As a consequence, the measurement flow rate v containing an error due to the nonlinearity of the magnetic field-magnetic flux characteristics is obtained, and the ratio of the predetermined flow rate V of the fluid actually flowing in the pipe line 9 to the measurement flow rate v is obtained (step S135). This value is then stored as the excitation adjustment coefficient A(k) at the exciting current Ik in the memory 5D (step S136).

If excitation adjustment coefficient setting processing is not completed for all the exciting currents (step S137: NO), the flow returns to step S131 to execute processing associated with an unprocessed exciting current. When excitation adjustment coefficient setting processing is completed for all the exciting currents (step S137: YES), the series of excitation adjustment coefficient setting operations is terminated. With this processing, with regard to errors due to the nonlinearity of the magnetic field-magnetic flux characteristics which differ depending on exciting currents, the excitation adjustment coefficient A(k) that makes a correction for each exciting current can be obtained.

In this manner, the ratio of the predetermined flow rate obtained by conducting an actual flow test on the pipe line 9 to the measurement flow rate obtained by measurement performed by the electromagnetic flowmeter is set as an excitation adjustment coefficient. This makes it possible to set excitation adjustment coefficients which can accurately correct the errors due to the nonlinearity of the magnetic field-magnetic flux characteristic without requiring any sophisticated processing. In addition, since excitation adjustment coefficients can be set by the adjustment coefficient setting section 5C using the actual electromagnetic flowmeter, i.e., the converter 10A and detector 10B, errors due to variations among apparatuses are small, and excitation adjustment coefficients can be set with high precision.

If variations among apparatuses are small with respect to magnetic field-magnetic flux characteristics, the excitation adjustment coefficients obtained by a plurality of electromagnetic flowmeters may be statistically processed, and the resultant representative excitation adjustment coefficients may be set in the memories 5D of the respective electromagnetic flowmeters. This eliminates the necessity to provide the adjustment coefficient setting section 5C for the converter 10A.

As has been described above, according to the present invention, the exciting current control section of the arithmetic processing section switches/selects one of a plurality of current values prepared in advance as the current values of exciting currents in accordance with a calculated measurement flow rate. In calculating a measurement flow rate from a signal electromotive force, the measurement flow rate calculation section corrects the measurement flow rate calculated from the signal electromotive force on the basis of one of the adjustment coefficients set in advance in correspondence with the respective current values of the exciting currents which corresponds to the current value of the exciting current by which the signal electromotive force is obtained. This makes it possible to accurately calculate a measurement flow rate even if the exciting current is switched in a plurality of steps in a wide range.

What is claimed is:

1. An electromagnetic flowmeter comprising:
    a coil which applies a magnetic field to a fluid flowing in a pipe line;
    exciting means for supplying an exciting current to said coil; and
    arithmetic processing means for calculating a measurement flow rate on the basis of a measurement signal detected from the excited fluid,
    said arithmetic processing means including measurement flow rate calculation means for, in calculating a measurement flow rate from the measurement signal, correcting the flow rate calculated from the measurement signal on the basis of one of adjustment coefficients set, in advance in correspondence with current values of exciting currents, which corresponds to a current value of an exciting current by which the measurement signal is obtained,
    wherein said arithmetic processing means comprises exciting current switching control means for switching/selecting in accordance with a calculated flow rate one of a plurality of current values prepared in advance as current values of exciting currents,
    wherein said arithmetic processing means comprises adjustment coefficient setting means for calculating an adjustment coefficient for correcting a flow rate for each exciting current switched by said exciting current switching control means.

2. A flowmeter according to claim 1, wherein said measurement flow rate calculation means uses a zero adjustment coefficient as an adjustment coefficient which is used to correct magnetic flux differential noise produced in signal electromotive force at different levels for the respective current values of exciting currents.

3. A flowmeter according to claim 1, wherein said measurement flow rate calculation means uses an excitation adjustment coefficient as an adjustment coefficient which is used to correct an error between a standard magnetic flux density for measurement flow rate calculation and an actual magnetic flux density of said coil which is produced at different levels for the respective current values of exciting currents due to nonlinearity of magnetic field-magnetic flux characteristics.

4. A flowmeter according to claim 1, wherein said measurement flow rate calculation means uses, as adjustment coefficients, a zero adjustment coefficient which is used to correct magnetic flux differential noise produced in signal electromotive force at different levels for the respective current values of exciting currents, and an excitation adjustment coefficient which is used to correct an error between a standard magnetic flux density for measurement flow rate calculation and an actual magnetic flux density of said coil which is produced at different levels for the respective current values of exciting currents due to nonlinearity of magnetic field-magnetic flux characteristics.

5. A flowmeter according to claim 4, wherein the zero adjustment coefficient is a measurement flow rate value calculated from a signal electromotive force at zero flow rate which is obtained by supplying an exciting current having each current value.

6. A flowmeter according to claim 5, wherein the excitation adjustment coefficient is a magnetic flux density ratio between a magnetic flux density in the pipe line which is actually measured by supplying an exciting current having each current value and a standard magnetic flux density corresponding to the current value.

7. A flowmeter according to claim 5, wherein the excitation adjustment coefficient is a flow rate ratio between a measurement flow rate calculated from a signal electromotive force produced when an exciting current having each current value is supplied and a fluid is made to actually flow and a flow rate measured independently when the measurement flow rate is calculated.

8. A flowmeter according to claim 5, wherein the excitation adjustment coefficient is a flow rate ratio between a known predetermined flow rate and a measurement flow rate calculated from a signal electromotive force produced when an exciting current having an each current value is supplied and a fluid is made to flow at the predetermined flow rate.

9. A flowmeter according to claim 1, further comprising:
    a pair of detection electrodes which are disposed to oppose each other through a fluid; and
    signal processing means for converting a DC flow rate signal obtained by sampling a detection signal generated between said detection electrodes into a measurement signal, and outputting the signal to said measurement flow rate calculation means.

10. A flowmeter according to claim 9, wherein said signal processing means comprises:
    amplification means for attenuating noise in a detection signal obtained from said detection electrodes and amplifying the signal;
    sampling means for sampling the signal output from said amplification means and outputting a DC flow rate signal; and
    A/D conversion means for A/D-converting the DC flow rate signal output from said sampling means and converting the signal into a flow rate signal.

* * * * *